Jan. 18, 1955   J. L. DEFFENBAUGH   2,699,974
SEALING AND SPACING MEANS FOR HINGE CONNECTIONS
Filed April 3, 1951
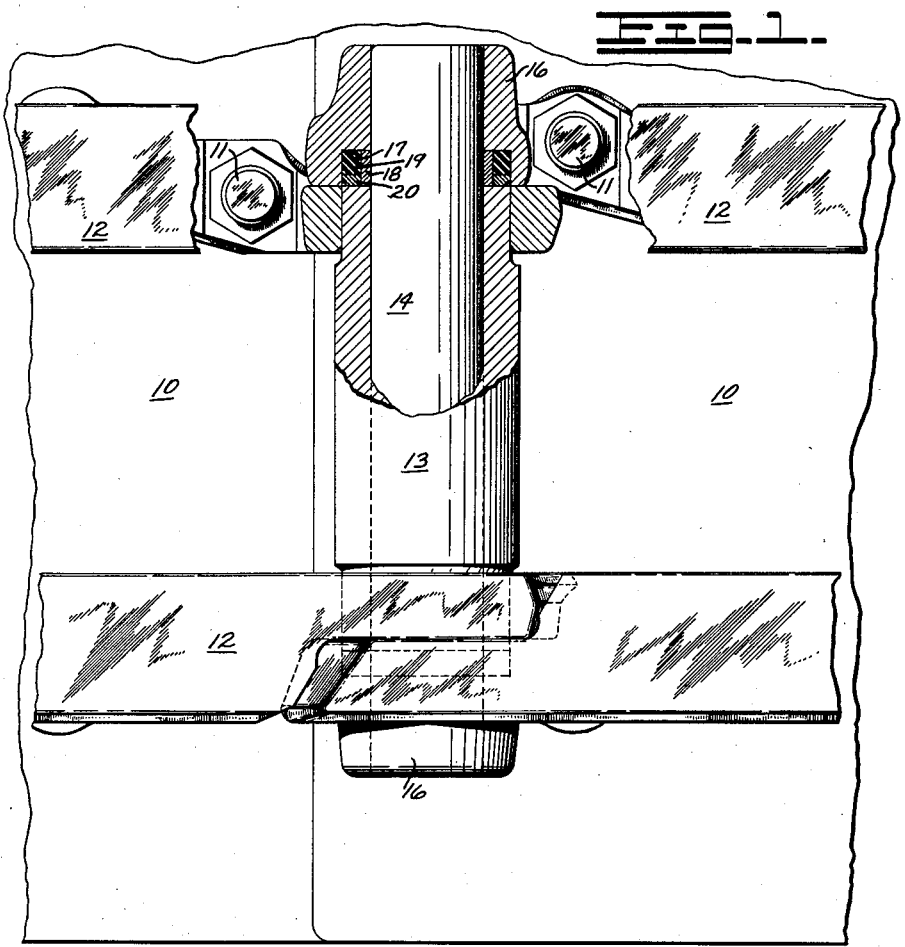
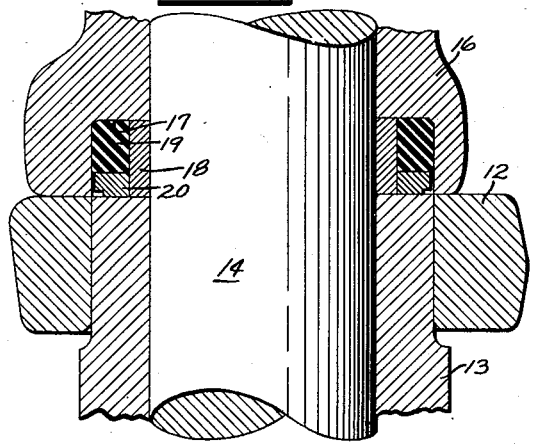
INVENTOR.
JOHN L. DEFFENBAUGH
BY
Charles M. Fryer
ATTORNEY.

United States Patent Office 2,699,974
Patented Jan. 18, 1955

2,699,974

SEALING AND SPACING MEANS FOR HINGE CONNECTIONS

John L. Deffenbaugh, Peoria, Ill., assignor to Caterpillar Tractor Co., Peoria, Ill., a corporation of California Application April 3, 1951, Serial No. 218,964

3 Claims. (Cl. 305—10)

This invention relates to an improved hinge connection and more particularly to improved sealing and spacing means for such a connection.

The present invention will have many applications but is especially useful for and will be disclosed herein as applied to the hinged joints of an endless track mechanism of the type commonly employed on track-type tractors.

In a track-type tractor, the endless track mechanism usually comprises a plurality of ground engaging track shoes each of which is secured to a pair of spaced track links pivotally connected to adjacent pairs of track links to form an endless chain. The track chain is trained about suitable guiding rollers and a driving sprocket to provide a rail surface for the supporting track rollers to ride. The track mechanism is subjected to extremely heavy duty in an environment of a particularly abrasive nature, and as a result, the hinge connections between pairs of track links are subject to rapid wear requiring frequent repair or replacement.

In the past, numerous efforts have been made to provide seals to prevent the entry of abrasive material into the hinge connections, but none have been successful enough to warrant their use. The principal reason that the seals employed in the past have not been successful is that they did not protect the rubbing surfaces limiting relative axial movement of the hinge parts. As a result, wear at these surfaces permitted excessive axial movement which, in turn, caused rapid deterioration of the seals allowing abrasive material to enter the joint. As a result, it has been relatively impractical to provide seals to exclude abrasive material from the hinge connections.

It is, therefore, an object of the present invention to overcome these difficulties by the provision of a hinge connection having a seal to prevent the entry of abrasive material into the connection and a spacer limiting relative axial movement of the hinge parts which is protected from contact with the abrasive material by the seal, thus materially increasing the life of both the seal and joint.

Other objects and advantages of this invention will be made apparent in the following specification wherein reference is made to the accompanying drawings.

In the drawings:

Fig. 1 is a fragmentary plan view of an endless track mechanism with parts broken away to more clearly illustrate the construction of a hinge connection embodying the present invention;

Fig. 2 is an enlarged fragmentary view in section of the hinge connection illustrated in Fig. 1; and Fig. 3 is an enlarged fragmentary view of the seal and spacer illustrated in Figs. 1 and 2 before assembly.

In Fig. 1 of the drawings, a portion of the endless track mechanism for a track-type tractor is illustrated as comprising track shoes 10 each of which is secured as by bolts 11 to a pair of spaced track links 12. At one end, each pair of links is pressed on to a bushing 13 having an axial bore for the reception of a pin 14 forming a pivotal connection with the overlapping ends of the adjacent pair of links. The overlapping ends of the links are provided with bosses 16 having openings for the reception of the extending ends of the pin 14 which are pressed into these openings. The fit between the bushing 13 and pin 14 is sufficiently loose to permit hinging of the connected track parts as the track passes around the driving sprocket and idler wheel of the tractor (not shown).

The inner face of each link adjacent the boss 16 is provided with an annular recess 17 for the reception of a spacing sleeve 18 disposed between the end of the recess and the adjacent end of the bushing 13. The spacing sleeve 18 is shown herein as a separate part for convenience in manufacture but may as well be a part of similar shape formed integrally either with the bushing 13 or the link. The recess also encloses a seal comprising a ring 19 of resilient material, such as rubber, and a seal washer 20 embracing the spacing sleeve. As is best illustrated in Fig. 3, the seal washer, before assembly, projects beyond the end of the spacing sleeve 18 so that when the seal is assembled in the track joint, the ring 19 is compressed. The resulting deformation almost entirely fills the recess urging the washer 20 into sealing engagement with the end of the track pin bushing. Because the spacing sleeve is protected from abrasives by the seal, the surfaces in thrust engagement are protected from destruction by abrasion and consequently excessive end play that tends to destroy the seal is avoided. The life of the seal is thus materially increased to provide a long-wearing joint. In addition, the use of a reliable seal makes it practical to pack the connection with lubricant at assembly to further increase its life. In the past, this was not practical, as the lubricant combined with the abrasive material to form a grinding compound resulting in more rapid wear than would otherwise occur in a substantially dry connection.

I claim:

1. A hinge connection comprising two parts connected for relative swinging movement by a pin, a spacing element embracing the pin to space said parts axially along the pin, a resilient member embracing the spacing element, a washer embracing the spacing element, said resilient member and said washer being compressed between the hinge parts to prevent the entry of foreign material into the hinge connection.

2. A hinge connection comprising two parts connected for relative swinging movement by a pin, an annular recess in one of said parts, a spacing part disposed within the annular recess embracing said pin to space said hinge parts from each other, and a seal of resilient material embracing said spacing part, said seal being compressed within the annular recess to prevent the entry of foreign material into the hinge connection.

3. A hinge connection comprising two parts connected for relative swinging movement by a pin, an annular recess in one of said parts, a spacing part disposed within the annular recess embracing said pin to space said hinge parts from each other, a seal of resilient material embracing said spacing part, and the seal being compressed within the annular recess between the hinge parts to prevent the entry of foreign material into the hinge connection.

References Cited in the file of this patent

UNITED STATES PATENTS

| Number | Name | Date |
|---|---|---|
| 436,008 | Robinson | Sept. 9, 1890 |
| 1,465,483 | Rockham | Aug. 21, 1923 |
| 1,881,179 | Foot | Oct. 4, 1932 |
| 1,946,798 | Kuchar | Feb. 13, 1934 |
| 2,329,303 | Stewart | Sept. 14, 1943 |
| 2,376,864 | Eberhard | May 29, 1945 |
| 2,551,695 | Oddy | May 8, 1951 |